United States Patent [19]

Hamada et al.

[11] Patent Number: 5,340,112
[45] Date of Patent: Aug. 23, 1994

[54] THREAD WOUND GOLF BALL

[75] Inventors: Akihiko Hamada, Kakogawa; Tadahiro Ebisuno, Nishinomiya, both of Japan

[73] Assignee: Sumitomo Rubber Industries, Ltd., Hyogo, Japan

[21] Appl. No.: 53,236

[22] Filed: Apr. 28, 1993

[30] Foreign Application Priority Data

Apr. 28, 1992 [JP] Japan .................... 4-135774

[51] Int. Cl.$^5$ .................. A63B 37/00; C08L 9/00; C08L 7/00
[52] U.S. Cl. ........................ 273/226; 273/227; 273/228; 273/DIG. 10; 273/DIG. 22; 525/315; 524/483; 524/908; 260/998.14
[58] Field of Search .............. 525/315; 524/908; 273/226, 218, 225, 227, 235 R, 222; 260/998.14

[56] References Cited

U.S. PATENT DOCUMENTS

| | | | |
|---|---|---|---|
| 3,119,622 | 1/1964 | Weigert | 273/227 |
| 3,281,389 | 10/1966 | Hirshfield | 525/236 |
| 4,261,403 | 4/1981 | Imai et al. | 525/236 |
| 4,272,079 | 6/1981 | Nakada et al. | 273/225 |
| 4,295,512 | 10/1981 | Kawaguchi et al. | 152/354 R |
| 4,353,557 | 10/1982 | Kajita et al. | 273/227 |
| 4,360,049 | 11/1982 | Imai | 152/209 R |
| 4,696,475 | 9/1987 | Tomita et al. | 273/227 |
| 4,840,988 | 6/1989 | Nakayama et al. | 524/483 |
| 5,215,308 | 6/1993 | Hiraoka et al. | 525/315 |

FOREIGN PATENT DOCUMENTS

| | | |
|---|---|---|
| 55-161834 | 12/1980 | Japan . |
| 59-076236 | 5/1984 | Japan . |
| 60-072573 | 4/1985 | Japan . |
| 2164260 | 3/1986 | United Kingdom . |
| 2232417 | 5/1990 | United Kingdom . |

Primary Examiner—James J. Seidleck
Assistant Examiner—Mark L. Warzel
Attorney, Agent, or Firm—Birch, Stewart, Kolasch & Birch

[57] ABSTRACT

The present invention provides a thread wound golf ball having excellent durability, heat resistance and impact resilience, which comprises a core, a thread rubber layer and an outer layer. A thread rubber constituting the thread rubber layer comprising a solid rubber containing a high-cis polyisoprene rubber as a main rubber material and a liquid polybutadiene rubber and-/or liquid butadiene-isoprene copolymer rubber as a rubber component.

11 Claims, No Drawings

1

THREAD WOUND GOLF BALL

FIELD OF THE INVENTION

The present invention relates to a thread wound golf ball. More particularly, it relates to a thread wound golf ball comprising a thread rubber layer having high strength and excellent impact resilience. The resulting golf ball has excellent durability, heat resistance and impact resilience.

BACKGROUND OF THE INVENTION

A thread wound golf ball is a golf ball comprising a core (liquid core or solid core), a thread rubber layer formed by winding a thread rubber around the core in a stretched state and a cover covering the thread rubber layer.

Generally, it is necessary that the golf ball has suitable impact resilience so as to obtain excellent flight performances. Particularly, the thread wound golf ball requires a thread rubber having excellent impact resilience, because impact resilience and flight performances of the ball is extremely influenced by the properties of the thread rubber layer.

A thread rubber having excellent impact resilience can be obtained by vulcanizing a rubber blend comprising a low-cis polyisoprene rubber as a base rubber, however, the low-cis polyisoprene rubber is inferior in mechanical strength and heat resistance. The thread rubber formed from the low-cis polyisoprene rubber imparts disadvantage to the resulting golf ball. That is, the thread rubber is liable to be damaged on forming the thread rubber layer by winding around the core at the stretched state, which is the cause of deterioration of durability of the ball. Further, heat upon forming the cover damages the thread wound layer, thus deteriorating ball compression.

Therefore, in order to improve the strength of thread rubber, it has been proposed to blend natural rubber or synthesized high-cis polyisoprene rubber in with the low-cis polyisoprene rubber. However, impact resilience of the resulting golf ball adversely declines, although its strength is improved. It is therefore difficult to obtain both impact resilience and high durability.

On the other hand, in the case of using a method of preparing the thread rubber from a coagulated sheet of a latex blend, a kneading process wherein breakage of molecular chain occurs is unnecessary. Therefore, the above disadvantage in strength is slightly improved. However strength and impact resilience thereof are still insufficient.

As described above, in the thread wound golf ball, impact resilience of the ball is extremely influenced by the properties of the thread rubber constituting the thread rubber layer, whereby flight performances of the ball are extremely influenced. According to the prior art, when impact resilience is increased, strength is lowered and, therefore, the thread rubber having both high strength and excellent impact resilience were not obtained.

OBJECTS OF THE INVENTION

Under these circumstances, the present inventors have intensively studied. As a result, it has been found that a thread wound golf ball having excellent durability, heat resistance and impact resilience can be obtained, by making a thread rubber from a rubber compound comprising a solid rubber containing a high-cis polyisoprene rubber and a liquid polybutadiene rubber and/or liquid butadiene-isoprene copolymer rubber and forming a thread rubber layer with the resulting thread rubber having high strength and excellent impact resilience.

Main object of the present invention is to provide a thread wound golf ball comprising a thread rubber layer having high strength and excellent impact resilience, which has excellent durability, heat resistance and impact resilience.

This object as well as other objects and advantages of the present invention will become apparent to those skilled in the art from the following description.

SUMMARY OF THE INVENTION

According to the present invention, there is provided a thread wound golf ball comprising a core, a thread rubber layer formed on said core and a cover covering said thread rubber layer. The thread rubber constituting said thread rubber layer is obtained by vulcanizing a rubber compound comprising a solid rubber containing a high-cis polyisoprene rubber and a liquid polybutadiene rubber and/or liquid butadiene-isoprene copolymer rubber.

DETAILED DESCRIPTION OF THE INVENTION

The term "high-cis polyisoprene rubber" used for the thread rubber in the present invention means natural rubber or synthesized high-cis polyisoprene rubber. The high-cis polyisoprene rubber may be solid in the dry state, and it may be used in the state of a solid rubber or in the state of a latex.

The natural rubber may be any one which is normally used in the rubber industry, and non-limited examples thereof include RSS#1, RSS#2, Pale Crape, Brown Crape and the like.

Among the natural rubbers, some kinds of natural rubbers are commercially available in the state of a latex. The natural rubber latex is not also limited to a specific one, but high ammonia type latex containing a solid content of about 60% by weight is preferred because its stability on formulation of latex is excellent.

The synthesized high-cis polyisoprene rubber is a rubber having a cis-1,4 bond of at least 98% which has a fine structure similar to the natural rubber, and it can be used in place of the natural rubber. Examples of the synthesized high-cis polyisoprene rubber in a solid state include JSR IR 2200 manufactured by Nippon Gosei Rubber Co., IR-10 manufactured by Kuraray Co., Nippol IR-2200 manufactured by Nippon Zeon Co. and the like.

As the solid rubber component, a low-cis polyisoprene rubber can be added in a predetermined amount so as to conduct auxiliary improvement of impact resilience, in addition to the high-cis polyisoprene rubber. When the level of low-cis polyisoprene rubber added is too great, the strength is extremely deteriorated and the improvement of the strength of the thread rubber is hindered. Therefore, the amount is preferably not more than 50% by weight, particularly not more than 30% by weight, based on the weight of the solid rubber. As is apparent from this description, the solid rubber comprising a high-cis polyisoprene rubber as a main rubber material in the present invention means that the solid rubber component is constituted only with the high-cis polyisoprene rubber or that the solid rubber component is constituted with the high-cis polyisoprene rubber and low-cis polyisoprene rubber.

The low-cis polyisoprene rubber contains a cis-1,4 bond of about 92%. Examples of those which are commercially available in the state of the solid rubber include Califlex IR-305 and Califlex IR-309 manufactured by Shell Chemical Co. Further, examples of the low-cis polyisoprene rubber which is commercially available in the state of the latex include Maxplene IR latex manufactured by Sumitomo Seika Co.

In the present invention, a liquid polybutadiene rubber and/or liquid butadiene-isoprene copolymer rubber as the liquid rubber is blended in (mixed with) the solid rubber. By blending the liquid rubber, strength and balance are obtained in high level, and impact resilience can be improved without deterioration of strength. Further, workability on winding of the thread rubber is improved by blending the liquid rubber.

Regarding the liquid polybutadiene rubber or liquid butadiene-isoprene rubber, a viscosity-average molecular weight (Mv) is preferably in the range of about 10,000 to 80,000, wherein the rubber shows viscous fluidity or semisolid state at room temperature (25° C.). When the viscosity-average molecular weight exceeds 80,000, it's property becomes similar to that of the solid rubber and the effect of improving impact resilience is deteriorated. When the viscosity-average molecular weight of the liquid rubber is less than 10,000, the rubber is difficult to vulcanize and the strength of the thread rubber is deteriorated.

It is suitable for improving impact resilience of the thread rubber that the liquid polybutadiene rubber or liquid butadiene-isoprene rubber contains at least 50%, particularly at least 80% of a cis-1,4 bond.

The weight ratio of butadiene to isoprene in the liquid butadiene-isoprene copolymer rubber is preferably 100:0 to 30:70.

As the commercially available article of the liquid polybutadiene rubber, for example, there are Kuraray LIR-300 manufactured by Kuraray Co. [viscosity-average molecular weight: 40,000; cis-1,4 bond in butadiene component: about 85%] and the like. As the commercially available article of the liquid butadiene-isoprene copolymer rubber, for example, there are Kuraray LIR-390 [weight ratio of butadiene to isoprene: 90:10; viscosity-average molecular weight: 48,000; cis-1,4 bond in butadiene component: about 85%], Kuraray LIR-340 [weight ratio of butadiene to isoprene: 40:60; viscosity-average molecular weight: 34,000; cis-1,4 bond in butadiene component: about 85%] (manufactured by Kuraray Co.) and the like. These are suitably used in the present invention.

These liquid rubbers are not commercially available in the latex state at present and, therefore, they must be converted to a latex in the case of using the solid rubber in the latex state. The liquid rubber is easily converted to the latex by dissolving it in a volatile solvent (e.g. n-pentane, n-hexane, n-heptane, toluene, etc.) followed by emulsification with an emulsifier, removal of the solvent by flash distillation and a further concentration step of centrifugation or ultrafiltration.

The weight ratio of the solid rubber to liquid rubber is preferably 97:3 to 70:30. When the amount of the liquid rubber is smaller than the above lower limit, the effect for improving winding workability of the thread rubber and impact resilience is not sufficiently obtained. When the amount of the liquid rubber is larger than the above upper limit, stretch becomes too large and winding workability is rather deteriorated.

The thread rubber can be prepared as follows. Vulcanization additives (e.g. vulcanizing agents, vulcanization accelerators, vulcanization auxiliaries, etc.), antioxidants, if necessary, small amount of fillers and oils are added to the rubber component to form a dry rubber compound or latex compound, which is formed into a thin sheet of about 0.15 mm in thickness and vulcanized. Then, the vulcanized rubber sheet is cut into thread pieces of about 1 to 2 mm in width.

Thereafter, the thread rubber thus obtained is wound around a core in the stretched state to form a thread wound layer which is then covered with a cover which generally comprises an ionomer resin or a trans-polyisoprene as a base material and then finished it with paint to obtain the thread wound golf ball of the present invention.

As the core, a conventional solid or liquid core can be used. The thickness of the thread rubber layer varies depending on a material of the cover and diameter of the core, but it is normally 4 to 8 mm.

EXAMPLE

The following Examples further illustrate the present invention in detail but are not to be construed to limit the scope thereof.

EXAMPLES 1 TO 4 AND COMPARATIVE EXAMPLES 1 AND 2

In order to prepare a thread rubber, six kinds of rubber latex blends shown in Tables 1 and 2 were firstly prepared. Among these six kinds of rubber latex blends, blends 1 to 4 shown in Table 1 are used for preparing thread rubbers of the golf balls of Examples 1 to 4, and blends 5 and 6 shown in Table 2 are used for preparing thread rubbers of the golf balls of Comparative Examples 1 and 2.

In Tables 1 and 2, the unit of a numerical value of each component is dry parts by weight. Regarding latex, a rubber content is shown. Regarding accelerator (vulcanization accelerator), sulfur and antioxidant, an active component content is shown. The details as to each component are explained at the notes attached to Table 2.

TABLE 1

| | Blend 1 | Blend 2 | Blend 3 | Blend 4 |
|---|---|---|---|---|
| Dunlop C-60 (natural rubber latex, rubber component: 60%) *1 | 80 | 80 | 70 | 70 |
| Kuraray LIR-300 (emulsion, rubber component: 45%) *2 | 20 | — | 20 | — |
| Kuraray LIR-390 (emulsion, rubber component: 45%) *3 | — | 20 | — | 20 |
| Maxplene IR (latex, rubber component: 65%) *4 | — | — | 10 | 10 |
| Accelerator (emulsion, active component: 20%) *5 | 1 | 1 | 1 | 1 |
| Sulfur (dispersion, active component: 50%) | 2 | 2 | 2 | 2 |
| Antioxidant (dispersion, active component: 50%) *6 | 1 | 1 | 1 | 1 |

TABLE 2

| | Blend 5 | Blend 6 |
|---|---|---|
| Dunlop C-60 (natural rubber latex, rubber component: 60%) *1 | 100 | 50 |
| Kuraray LIR-300 (emulsion, | — | — |

TABLE 2-continued

|  | Blend 5 | Blend 6 |
|---|---|---|
| rubber component: 45%) *2 |  |  |
| Kuraray LIR-390 (emulsion, rubber component: 45%) *3 | — | — |
| Maxplene IR (latex, rubber component: 65%) *4 | — | 50 |
| Accelerator (emulsion, active component: 20%) *5 | 1 | 1 |
| Sulfur (dispersion, active component: 50%) | 2 | 2 |
| Antioxidant (dispersion, active component: 50%) *6 | 1 | 1 |

(Note)
*1: Dunlop C-60 (trade name), natural rubber latex stored by adding a large amount of ammonia, manufactured by Malaysia Dunlop Estate Co.
*2: Kuraray LIR-300 (trade name), liquid polybutadiene rubber (viscosity-average molecular weight: 40,000; cis-1,4 bond of butadiene: about 85%) manufactured by Kuraray Co.
*3: Kuraray LIR-390 (trade name), liquid butadiene-isoprene copolymer rubber (butadiene:isoprene = 90:10 (weight ratio); viscosity-average molecular weight: 48,000; cis-1,4 bond of butadiene component: about 85%) manufactured by Kuraray Co.
*4: Maxplene IR (trade name), low-cis isoprene rubber latex, manufactured by Sumitomo Seida Co.
*5: Accelerator, Noxelar 8 (trade name), butylaldehyde-aniliine condensate, manufactured by Ohuchi Shinko Kagaku Kogyo Co.
*6: Antioxidant, Yoshinox 425 (trade name), 2,2'-methylene-bis-(4-ethyl-6-t-butylphenol), manufactured by Yoshitomi Seiyaku Co.

The above latex blends 1 to 6 were placed on an endless belt on which a coagulant solution (calcium chloride solution) was applied to coagulate on the belt, respectively. The coagulated sheet thus obtained was rinsed with water and dried. Then, it was rolled round a drum and placed in a vulcanizer to vulcanize at 140° C. for 2 hours.

Thus, a vulcanized rubber sheet of 350 mm in width, 0.54 mm in thickness and about 30 m in length was prepared and the resulting vulcanized rubber sheet was cut in pieces of 1.6 mm in width to prepare a thread rubber.

The thread rubber thus obtained was wound around a solid core of vulcanized polybutadiene rubber [outer diameter: 28.5 mm; hardness: 80 (JIS-A); weight: 18.2 g ] at the stretched state to form a thread wound core of about 40 mm in outer diameter, which was covered with an outer layer material of a mixture comprising 100 parts by weight of ionomer resin and 2 parts by weight of titanium oxide to form an outer layer. After pretreatment, paint mark was provided to produce a thread wound golf ball of 42.7 mm in outer diameter.

The ionomer resin used on the formation of the outer layer is a mixture of HI-MILAN 1706, HI-MILAN 1605, HI-MILAN 1557 and HI-MILAN 1555 manufactured by Mitsui Du Pont Polychemicals Co. (weight ratio=45:40:5:10). The weight of the resulting thread wound golf ball was in the range of 45.4 to 45.6 g.

Ball properties (compression, initial velocity, durability and heat resistance) of the thread wound golf ball thus obtained are shown in Tables 3 and 4, together with a kind of the blend of the thread rubber. The measuring method of the ball properties are explained in detail at the notes attached to Table 4.

TABLE 3

| Blend of thread rubber | Ex. 1 Blend 1 | Ex. 2 Blend 2 | Ex. 3 Blend 3 | Ex. 4 Blend 4 |
|---|---|---|---|---|
| Compression (PGA system) | 85 | 85 | 85 | 85 |
| Initial velocity (feet/second) *7 | 252.3 | 252.0 | 252.8 | 252.5 |
| Durability (index) *8 | 140 | 141 | 134 | 136 |
| Heat resistance (compression deterioration point) *9 | −9 | −9 | −11 | −11 |

TABLE 4

| Blend of thread rubber | Comp. Ex. 1 Blend 5 | Comp. Ex. 2 Blend 6 |
|---|---|---|
| Compression (PGA system) | 85 | 85 |
| Initial velocity (feet/second) *7 | 248.0 | 252.5 |
| Durability (index) *8 | 140 | 100 |
| Heat resistance (compression deterioration point) *9 | −9 | −18 |

(Note)
*7: It is measured by R & A method.
*8: A golf ball is allowed to bump at a speed of 45 m/second, repeatedly. The number of times at which the ball is broken is determined. The number is expressed as an index when the number of Comparative Example 2 is made 100.
*9: A golf ball is aged in an oven at 70° C. for 72 hours. Difference between compression after aging and initial compression is expressed as a value of PGA system. The minus value indicates that compression is deteriorated.

As is shown in Table 3, regarding the golf balls of Examples 1 to 4, the index which indicates durability was large and the initial velocity was also large. The golf balls had excellent durability and impact resilience.

To the contrary, regarding the golf ball of Comparative Example 1 comprising only a natural rubber as the base component, the index which indicates durability was large and durability was excellent, but the initial velocity was small and impact resilience was extremely deteriorated, as shown in Table 4. Regarding the golf ball of Comparative Example 2 comprising a mixture of natural rubber and low-cis polyisoprene rubber as the rubber component, the initial velocity was large and impact resilience was excellent, but the index which indicates durability was small and durability was inferior in comparison with others, as shown in Table 4.

The golf balls of Examples 1 to 4 showed small compression deterioration point in comparison with that of Comparative Example 2 and heat resistance was excellent.

As described above, a thread wound golf ball having excellent durability, heat resistance and impact resilience can be obtained, by making a thread rubber layer from a thread rubber of a blend comprising a solid rubber containing a high-cis poyisoprene rubber as a main rubber material and a liquid polybutadiene rubber and/or liquid butadiene-isoprene copolymer rubber as a rubber component.

What is claimed is

1. A thread wound golf ball comprising a core, a thread rubber layer formed on said core and a cover covering said thread rubber layer, wherein the thread rubber constituting said thread rubber layer is obtained by vulcanizing a rubber compound comprising:
   (a) a solid rubber comprising a high-cis polyisoprene rubber, and
   (b) a liquid polybutadiene rubber and/or liquid butadiene-isoprene copolymer rubber.

2. The thread wound golf ball according to claim 1 wherein said solid rubber further comprises a low-cis polyisoprene rubber.

3. The thread wound golf ball according to claim 1 wherein said liquid polybutadiene rubber and/or liquid butadiene-isoprene copolymer rubber have a viscosity average molecular weight (Mv) of 10,000 to 80,000.

4. The thread wound golf ball according to claim 1 wherein the polybutadiene portion of the liquid rubber component (b) has a cis-1,4-structure of at least 50%.

5. The thread wound golf ball according to claim 1 wherein said solid rubber (a) and liquid rubber (b) are used in an amount ratio (a:b) of 97:3 to 70:30.

6. The thread wound golf ball according to claim 1 wherein said core is made from rubber or liquid.

7. The thread wound golf ball according to claim 1 wherein said cover is made from an ionomer resin or a transpolyisoprene.

8. The thread wound golf ball according to claim 1 wherein said rubber layer has a thickness of 4 to 8 mm.

9. The thread wound golf ball according to claim 1, wherein said rubber compound is made from a latex blend.

10. The thread wound golf ball according to claim 1 wherein the polybutadiene portion of the liquid rubber component (b) has a cis-1,4 structure of at least 80%.

11. A thread wound golf ball comprising a core, a thread rubber layer formed on said core and a cover covering said thread rubber layer, wherein the thread rubber constituting said thread rubber layer is obtained by vulcanizing a rubber compound comprising:
  (a) a solid rubber comprising a major amount of a high-cis polyisoprene rubber, and
  (b) a liquid polybutadiene rubber and/or liquid butadieneisoprene copolymer rubber.

* * * * *